(12) United States Patent
Duerr et al.

(10) Patent No.: US 8,193,443 B2
(45) Date of Patent: Jun. 5, 2012

(54) PHOTOVOLTAIC CELL

(75) Inventors: Michael Duerr, Mannheim (DE);
Gabriele Nelles, Stuttgart (DE); Akio Yasuda, Tokyo (JP); Masahiro Morooka, Kanagawa (JP); Yusuke Suzuki, Kasasaki (JP); Kazuhiro Noda, Kanagawa (JP)

(73) Assignees: Sony Deutschland GmbH, Berlin (DE); Sony Corporation, Tokyo (JP)

( * ) Notice: Subject to any disclaimer, the term of this patent is extended or adjusted under 35 U.S.C. 154(b) by 258 days.

(21) Appl. No.: 11/963,090

(22) Filed: Dec. 21, 2007

(65) Prior Publication Data

US 2008/0245410 A1 Oct. 9, 2008

(30) Foreign Application Priority Data

Dec. 22, 2006 (EP) ................................. 06026773
Feb. 7, 2007 (EP) ................................. 07002646

(51) Int. Cl.
*H01L 33/0384* (2006.01)

(52) U.S. Cl. ........ 136/263; 136/258; 136/260; 136/261; 136/262; 136/264; 136/265; 438/63; 438/77; 438/82

(58) Field of Classification Search ........... 136/252–265
See application file for complete search history.

(56) References Cited

U.S. PATENT DOCUMENTS

| | | |
|---|---|---|
| 2004/0226602 A1 | 11/2004 | Durr et al. |
| 2005/0189014 A1* | 9/2005 | Gaudiana et al. ............. 136/256 |
| 2007/0062576 A1 | 3/2007 | Duerr et al. |
| 2007/0209696 A1 | 9/2007 | Duerr et al. |

FOREIGN PATENT DOCUMENTS

CN 1719619 1/2006

OTHER PUBLICATIONS

U.S. Appl. No. 11/578,843, filed Oct. 19, 2006, Duerr, et al.
U.S. Appl. No. 12/518,705, filed Jun. 11, 2009, Duerr, et al.

* cited by examiner

*Primary Examiner* — Jennifer Michener
*Assistant Examiner* — Jayne Mershon
(74) *Attorney, Agent, or Firm* — Oblon, Spivak, McClelland, Maier & Neustadt, L.L.P.

(57) ABSTRACT

The present invention relates to a photovoltaic cell, a method of manufacturing such photovoltaic cell, and to uses of such cell.

22 Claims, 7 Drawing Sheets

| Cell | Voc [V] | Jsc [mA/cm$^2$] | FF [%] | Eff. [%] |
|---|---|---|---|---|
| Standard spacer | 0.69 | 15.1 | 72 | 7.5 |
| Porous TiO$_2$ spacer | 0.70 | 14.8 | 71 | 7.3 |

Fig. 3

| Cell | Voc [V] | Jsc [mA/cm$^2$] | FF [%] | Eff. [%] |
|---|---|---|---|---|
| Standard spacer (2 μm) | 0.79 | 19.9 | 43 | 6.8 |
| Porous TiO$_2$ spacer (2μm) | 0.71 | 17.7 | 54 | 6.8 |
| ¼ of photoactive porous layer covered by standard spacer | 0.75 | 16.3 | 39 | 4.7 |

Fig. 7

PHOTOVOLTAIC CELL

The present invention relates to a photovoltaic cell, a method of manufacturing such photovoltaic cell, and to uses of such cell.

Single crystal solar cells show energy conversion efficiencies as high as ~25%. Where the Si-based crystals are no longer single crystals but polycrystalline, the highest efficiencies are in the range of ~18%, and with amorphous Si, the efficiencies are ~12%. Solar cells based on Si are, however, rather expensive to manufacture, even in the amorphous Si version. Therefore alternatives have been developed based on organic compounds and/or a mixture of organic and inorganic compounds, the latter type solar cells often being referred to as hybrid solar cells. Organic and hybrid solar cells have proved to be cheaper to manufacture, but seem to have yet comparably low efficiencies even when compared to amorphous Si cells. Due to their potential inherent advantages such as light weight, low-cost fabrication of large areas, environmentally friendly materials, or preparation on flexible substrates, efficient organic devices might prove to be technically and commercially useful "plastic solar cells". Recent progress in solar cells based on dye-sensitized nanocrystalline titanium dioxide (porous $TiO_2$) semiconductor and a liquid redox electrolyte demonstrates the possibility of a high energy conversion efficiencies in organic materials. (B. O-Regan and M. Grätzel, Nature 353 (1991, 737).

Photoelectrochemical cells based on sensitisation of nanocrystalline $TiO_2$ by molecular dyes (dye-sensitized solar cells, DSSC) have attracted great attention since their first announcement as efficient photovoltaic devices (B. O'Regan and M. Grätzel, see above; WO 91/16719). One part of the ongoing investigations is to exploit the potential applicability of such cells on flexible substrates and with this the potential of fabricating flexible solar cells.

Dye-sensitized solar cells are based on the photoexcitation of electrons in dye molecules which are attached to semiconductor particles, such as $TiO_2$, of a nanoporous network. The electrons can be injected into the conduction band of the semiconductor, and if charge recombination is suppressed, the electrons can be collected at one of the electrodes whereas the dye molecules are regenerated from a counter electrode via a charge-conducting agent. A matter which was treated so far only sporadically is the separation of the active porous semiconductor layer and the counter electrode. The standard approach to solving this problem was so far the use of spacer foils which are made for example from plastic and which are located beside the active porous layer, as can be inspected in FIG. 1a). However, so far, this has not led to satisfying results in that solar cells constructed in this manner are highly pressure sensitive and give rise to numerous short cuts especially when pressure is exerted on the counter electrode which thereby is effectively pressed onto the active layer or vice versa. Moreover, the spacer foils of the prior art block areas that could otherwise be used for charge transport processes which areas are therefore not available for the active layer. Quite recently, flexible dye-sensitized solar cells have attracted increasing attention. So far, also these have usually been constructed with spacer foils that are located beside the active porous layer. Again, such flexible dye-sensitized solar cells are highly pressure sensitive and highly sensitive towards bending, as either of these influences may lead to the counter electrode ultimately coming into electrical contact with the first electrode and thereby giving rise to a short cut again. The problem is even exacerbated when the solar cell extends over a certain area.

Accordingly, it was an object of the present invention to provide for an improved solar cell that is not as sensitive towards the exertion of pressure on one of the electrodes. Moreover, it was an object of the present invention to provide for an improved solar cell that is not so sensitive towards bending of the electrodes of the solar cell. It was furthermore an object of the present invention to provide for a solar cell that does not show as many short cuts as conventional solar cells constructed in accordance with the prior art.

All these objects are solved by a photovoltaic cell comprising a first substrate and a first electrode on said first substrate, preferably in the form of a layer covering said first substrate, more preferably in the form of a layer of a transparent conductive oxide, or, alternatively, a first metal foil acting as a first substrate and a first electrode,
  a porous semiconductor layer which is a photoactive layer, on said first electrode,
  a porous spacer layer on said porous semiconductor layer,
  a second electrode as counter-electrode on said porous spacer layer and in physical contact therewith, said second electrode preferably in the form of a layer covering said porous spacer layer,
  a second substrate on said second electrode,
wherein said porous semiconductor layer has a first interstitial space formed by pores of said porous semiconductor layer, and said porous spacer layer has a second interstitial space formed by pores of said porous spacer layer, wherein said first and second interstitial spaces are in fluid connection with each other and are filled with an electrolyte, and wherein said porous spacer layer on one side is in physical contact with said second electrode, and wherein said porous spacer layer on another side is in physical contact with said porous semiconductor layer.

In one embodiment said porous spacer layer on one side over its entire area is in physical contact with said second electrode, and wherein said porous spacer layer on another side over its entire area is in physical contact with said porous semiconductor layer.

In one embodiment between said porous spacer layer and said second electrode, there is no void volume of electrolyte other than said second interstitial space.

Preferably, said porous spacer layer is made of an optically transparent material that is semiconducting or electrically insulating.

In one embodiment said porous spacer layer has pores with a pore size in the range of from 5 nm to 100 µm, preferably 5 nm to 1 µm, more preferably 5 nm to 500 nm, and most preferably 10 nm to 100 nm.

In one embodiment said porous spacer layer is a foil having pores with an average diameter in the range of from 10 nm to 100 µm, preferably from 10 nm to 1 µm.

In another embodiment said porous spacer layer is made from particles having sizes in the range of from 1 nm to <1 µm, preferably from 1 nm to 500 nm, more preferably from 1 nm to 300 nm, even more preferably from 1 nm to 200 nm and most preferably from 10 nm to 100 nm.

In one embodiment said particles are semiconductor particles or insulator particles, wherein, preferably, said semiconductor or insulator particles are made of a material or a combination of materials, selected from $TiO_2$, $SnO_2$, $Sb_2O_5$, CdTe, CdSe, CdS, ZnO, $Nb_2O_5$, $ZrO_2$, $CeO_2$, $WO_3$, $SiO_2$, $Al_2O_3$, $CuAlO_2$, $SrTiO_3$, $SrCu_2O_2$, $SiO_2$, (preferably silica or glass beads), heat resistant polymers, such as crosslinked silicone resin, crosslinked polystyrene, crosslinked acrylic resin, melamine-formaldehyde resin, aromatic polyamide resin, polyimide resin, polyamide-imide resin, crosslinked polyesters, metal carbonates, such as magnesium carbonate, calcium carbonate, metal sulfates, such as calcium sulfate, barium sulfate.

In one embodiment said porous semiconductor layer is dye-sensitized and said porous spacer layer is not dye-sensitized.

Preferably, said porous spacer layer covers said porous semiconductor layer over the entire area of said porous semiconductor layer and thereby electrically insulates said porous semiconductor layer from said second electrode.

In one embodiment said cell does not comprise any spacer entities, such as spacer foils, arranged between said first and said second electrode, that electrically insulate said porous semiconductor layer from said second electrode and that are located beside said porous semiconductor layer.

Preferably, said cell comprises said porous spacer layer as the only spacer entity to electrically insulate said porous semiconductor layer from said second electrode.

In one embodiment said porous spacer layer has a pore size distribution or monodisperse pore size in the range of from 5 nm to 100 µm, preferably from 5 nm to 1 µm, more preferably from 5 nm to 500 nm, and most preferably from 10 nm to 100 nm.

In one embodiment said particles of said porous spacer layer have a particle size distribution or monodisperse pore size in the range of from 1 nm to <1 µm, preferably from 1 nm to 500 nm, more preferably from 1 nm to 300 nm, even more preferably from 1 nm to 200 nm, and most preferably from 10 nm to 100 nm.

Preferably, said porous spacer layer has a thickness in the range of from 100 nm to 100 µm, preferably from 1 µm to 10 µm.

In one embodiment said porous spacer layer covers parts of the area of said porous semiconductor layer and does not cover other parts of the area of said porous semiconductor layer, and wherein the covered area of said porous semiconductor layer is >50% of the entire area of said porous semiconductor layer.

In one embodiment in said porous spacer layer a ratio between gap size and pore size is in the range of from 1 to 1000, preferably from 10 to 100.

Preferably, said porous spacer layer is produced via a method selected from screen printing, doctor blading, ink-jet-printing, drop-casting, spin coating, spraying, electrostatic layer-by-layer self-assembly, lift-off process, mineralization, and anodic oxidation.

In one embodiment a first metal foil is used instead of said first substrate and said first electrode together, and wherein said second electrode is a semitransparent metal layer, e.g. a semitransparent Pt layer, and wherein said cell comprises said second substrate which is a transparent substrate, and wherein between said second substrate and said second electrode, optionally there is a transparent conductive oxide.

The objects of the present invention are also solved by a method of assembling a cell according to the present invention comprising the steps:

A):
 a) providing a first substrate and a first electrode thereon or, alternatively, providing a first metal foil,
 b) applying a porous semiconductor layer on the product of step a), namely on said first electrode or on said first metal foil, or, alternatively, applying a semiconductor blocking layer on the product of step a), namely on said first electrode or on said first metal foil, and then applying a porous semiconductor layer on said semiconductor blocking layer,
 c) sintering the product of step b) at temperatures >300° C.
 d) dye-sensitizing said porous semiconductor layer in the product of step c) and filling it with electrolyte, B) which is performed separately from A):
 a') providing a second substrate and a second electrode thereon or, alternatively, providing a second metal foil, said second metal foil being provided only if, in step A), no first metal foil is provided,
 b') applying a porous semiconductor layer on the product of step a'), namely on said second electrode or on said second metal foil,
 c') drying the product of step b')
 d') filling the porous semiconductor layer of the product of step c') with electrolyte, C) which is performed after completion of A) and B):
 a") bringing into contact the product of A) and B) via the sintered, dye-sensitized and electrolyte filled porous semiconductor layer of step d) and the dried, electrolyte-filled porous semiconductor layer of step d'), which layers are put into physical contact with each other.

The objects of the present invention are also solved by the use of a porous spacer layer in a photovoltaic cell for preventing short circuiting between a photoactive semiconductor layer and a counter electrode of said cell, and/or for insulating a photoactive semiconductor layer and a counter electrode of said cell from each other, wherein said porous spacer layer is as defined above.

As used herein, the term "active layer" is meant to refer to a layer within a photovoltaic cell that is involved in light absorption, charge separation and charge transfer processes. The term is herein used interchangeably with "photoactive". In many instances such photoactive layer is a photoactive porous layer, more specifically a photoactive porous semiconductor layer.

As used herein, an electrode is referred to as being "in physical contact with" a layer, if the electrode with one of its faces touches the layer. Preferably, this term is meant to refer to an electrode that takes the shape of a layer itself, for example a layer of transparent conductive oxide or a layer of metal, which layer with one of its surfaces touches and is situated upon the other layer, for example a porous spacer layer. In essence, such arrangement can be described as a laminate of two layers on top of each other. In some embodiments the electrode, e.g. the first or second electrode, may also be a metal foil.

The term "interstitial space" as used herein, is meant to refer to the space created and formed by the pores within a porous layer. The interstitial space is essentially a network of pores that are linked together. Two interstitial spaces are referred to herein as being "in fluid connection with" each other, if fluid, such as gas or liquid, present in one interstitial space can move into the other interstitial space without a physical barrier between the two interstitial spaces. That is to say the two interstitial spaces are in communication with each other, and the movement of a chemical species within the interstitial spaces, e.g. of a solvent molecule or of an electrolyte, is only limited by diffusion and not by any solid physical barriers.

The term "a void volume of electrolyte" as used herein, is meant to refer to any bulk volume taken up by electrolyte which is not interstitial space.

The term "gap size" as used herein, is meant to refer to the distance of the surface of the photoactive porous layer to the counter electrode (see, for example, FIG. 1a) and b). The photoactive porous layer or photoactive porous semiconductor layer may be considered as forming a part of the photoactive electrode.

As used herein, the term "sintering" when used in connection with a porous particle layer is meant to refer to a heat treatment step of for example a semiconductor particle layer in the course of which one or several of the following processes take place: An increase of particle contact by formation of sinter-bridges, formation of a porous network in which the original particles may not necessarily be identifiable anymore, and further smoothening of the pores. As a general rule, any sintering process in accordance with the present invention, when applied to a semiconductor layer involves temperatures >300° C.

"Sintering" is to be contrasted to "drying", as used herein, of a semiconductor layer. Such "drying" mainly involves the elimination of any liquid components or materials/solids with low boiling temperature previously present in the semiconductor layer, such as, for example, solvent. Usually, such "drying" occurs at temperatures <250° C.

It is one essential idea underlying the present invention that effectively, the porous spacer layer creates an electrically insulating barrier between the counter electrode and the first electrode or the photoactive layer, whilst at the same time the porous spacer layer is in direct contact with the counter electrode and thereby does not allow the formation of bulk volume or gap volume that would lie between the porous spacer layer and the counter electrode, as such gap volume would, again, make the resulting cell pressure sensitive towards the exertion of pressure on the counter electrode or front electrode.

Sometimes, in this application, reference is made to an "entire area" of a layer that is covered or contacted by another layer. This term as used herein, is meant to refer to the area of a fictitious plane parallel to and on the surface of such layer at which the contact occurs. In other words, the layer is treated as if it had a smooth plane as a surface, and it is the area of such smooth plane to which the term "entire area" refers. If only "parts" or a "part" of "the entire area" is covered or contacted, this usually refers to a proportion of the area of such fictitious plane. The phrase "the covered area of said porous semiconductor layer is >50% of the entire area of the porous semiconductor layer", as used herein, is meant to refer to >50% of the area of a fictitious plane on the surface of a porous semiconductor layer being covered. Hence, unless indicated otherwise, the term "entire area" or "area" usually refers to the area of such fictitious plane, and not to the actual surface area of the porous semiconductor layer/porous spacer layer which may have a much larger surface area because of its particulate character.

The term "heat resistant polymer", as used herein, is meant to refer to a polymer which remains dimensionally stable under the influence of heat. Preferably, it refers to a polymer that remains dimensionally stable in a temperature range of the operating temperatures of a photovoltaic cell. More preferably, a "heat resistant polymer" is a polymer that remains dimensionally stable in a temperature range up to and including 80° C.

As used herein, particles that have sizes in the range of from 1 nm to <1 μm are also sometimes referred to as "nanoparticles".

The semiconductor or insulator particles of the porous spacer layer may be made of any of the aforementioned semiconductor or insulator materials, or of a combination of any of the aforementioned materials. Likewise, there may be more than one kind of particles in the sense that there may be different particles each made of a different semiconductor or insulator material or those with a core shell structure. Such core shell structures of nanoparticles are known to someone skilled in the art.

In the method of assembling a cell in accordance with the present invention, step C) involves the sandwiching of the products of steps A) and B). Such sandwiching is known to someone skilled in the art and is for example achieved by putting the two products in physical contact with each other and holding them together by e.g. clamping or sealing them together with e.g. glue or glass seal.

A photovoltaic cell that is dye-sensitized, as used herein, is also sometimes referred to as a dye-sensitized solar cell (DSSC).

Substrates that may be used in accordance with the present invention are transparent substrates, such as glass, plastic, e.g. polymethylmethacrylate (PMMA) and others. Substrates may be rigid or flexible. It is clear to someone skilled in the art that there exists a wide variety of flexible substrates. For example flexible substrates may be used, such as but not limited thereto: polyethylene terephthalate (PET), polyethylene naphthalate (PEN), polyethersulphone (PES), polymethylmethacrylate (PMMA), polyimide (kapton), polyetheretherketone (PEEK), polyetherimide (PEI), OHP (overhead transparencies), metal foils like Ti-foil, Pt-foil, Al-foil, stainless steel.

Electrodes useful in accordance with the present invention are metal electrodes that have been applied as a layer on the substrate, and/or transparent conductive oxides (TCO), such as conductive ITO (Indium tin oxide) or FTO (fluorine tin oxide) or ATO (antimony tin oxide) or zinc oxide (ZnO). In the case of flexible solar cells, the one or the other substrate and the electrode layer applied thereon can be replaced by a metal foil which has enough rigidity to function as a supporting substrate as well as the required conductivity. If the flexible solar cell is a dye-sensitized solar cell illuminated from the back, the front electrode and substrate is formed by the aforementioned metal foil, whereas the other electrode is formed by a semi-transparent metal layer, such as Pt alone or in combination with a transparent conductive oxide, on top of which an additional transparent substrate is placed. A schematic diagram of such backside illuminated DSSC is shown in FIG. 4.

There are numerous ways of applying porous layers such as porous semiconductor layers on substrates or electrodes, such as screen-printing, doctor blading, ink-jet printing, drop casting, spin coating, spraying, layer-by-layer-assembly, lift-off-processes and anodic oxidation all of which are well known to a person skilled in the art.

The "porous semiconductor layer which is a photoactive layer" as used herein, is a layer of semiconductor particles which is involved in light absorption, charge separation and charge transfer processes. Usually, it is made from semiconductor particles which are made of a material or a combination of materials known to persons skilled in the art. It is clear to someone skilled in that art that a wide variety of semiconductor particles can be used for producing such a photoactive porous semiconductor layer. Examples of such material are, without being limited thereto: $TiO_2$, $SnO_2$, $Sb_2O_5$, CdTe, CdSe, CdS, ZnO, $Nb_2O_5$, $ZrO_2$, $CeO_2$, $WO_3$, $SiO_2$, $Al_2O_3$, $CuAlO_2$, $SrTiO_3$ and $SrCu_2O_2$.

The inventors have surprisingly found that by avoiding the conventional prior art spacer foils, effectively, the photoactive area available for charge separation and transfer processes can be enlarged whilst at the same time, the frequency of short circuiting is decreased. This is achieved in accordance with the present invention by the presence of a porous spacer layer that is not a photoactive layer which acts as an insulator and/or separator of the photoactive layer and the counter electrode. The inventors have found that the use of such a porous spacer layer has the advantage of a lower probability of short circuiting of the dye-sensitized solar cell during operation.

The production of flexible photovoltaic cells comprising such a porous spacer layer yields a 0% failure rate with respect to short circuiting, whereas flexible photovoltaic cells without such a porous spacer layer yield failure rates ≧50% due to short-circuiting.

The general concept is sketched in FIG. 1(b). It makes use of a material which (i) ensures electrical separation between the photoactive porous layer and the counter electrode over the whole area of the active porous layer or a major part thereof and/or the whole area of the counter electrode or a major part thereof and (ii) enables the ions in the electrolyte to move freely between the photoactive porous layer and the counter electrode. These tasks can be fulfilled by a porous material with channels which fills completely or a major part of the gap between the 2 electrodes (i.e. the area between the surfaces of the photoactive layer and the counter electrode. The pore size has to be in the order of the gap size or smaller between the two electrodes. If, e.g., the distance between the single channels was larger than the diffusion path across the gap, this additional distance could negatively influence the cell performance, especially it could lead to diffusion limitations to the short current density and fill factor of the cell.

As an example, a material which is found to fulfil all these requirements is nanoporous $TiO_2$. Nanoporous $TiO_2$ is normally sintered at temperatures above 400° C. to ensure good electrical contact between the single particles. When the nanoporous $TiO_2$ is applied on the counter electrode and the particles are brought into good mechanical contact at lower temperatures, this $TiO_2$ layer can be brought into direct contact with the active porous layer and no electrical current will flow via the porous material between the active porous layer and the counter electrode. To ensure that the porosity of the material is high enough, i.e. that enough connected channels between the active porous layer and the counter electrode exist, organic material is normally added to the nanoparticles. The voids left behind after burning the organic material at high temperatures then determine the porosity of the porous layer. In case of the low-temperature treatment of the porous spacer layer, an organic-free suspension of $TiO_2$ may be used and the porosity is solely adjusted by the particle size and degree of aggregation of the nanoparticles without high sintering temperatures.

Reference is now made to the figures, wherein

FIG. 1 shows a comparison of a photovoltaic cell using standard spacer (FIG. 1a) foils and an embodiment of a photovoltaic cell in accordance with the present invention (FIGS. 1b and 1c). It can be seen that the photovoltaic cell using standard spacers has a void volume between the active porous layer and the electrode, whereas there is no such void volume in the photovoltaic cell according to the present invention thus making this less sensitive towards pressure influences. The diameters of the nanoparticles of the porous spacer layer can be the same (FIG. 1c) or different (FIG. 1b) to the one of the photoactive porous layer. All pores are filled with electrolyte.

FIG. 3 shows the photovoltaic parameters of a cell using spacer foils and a cell in accordance with the present invention.

Figure 4:
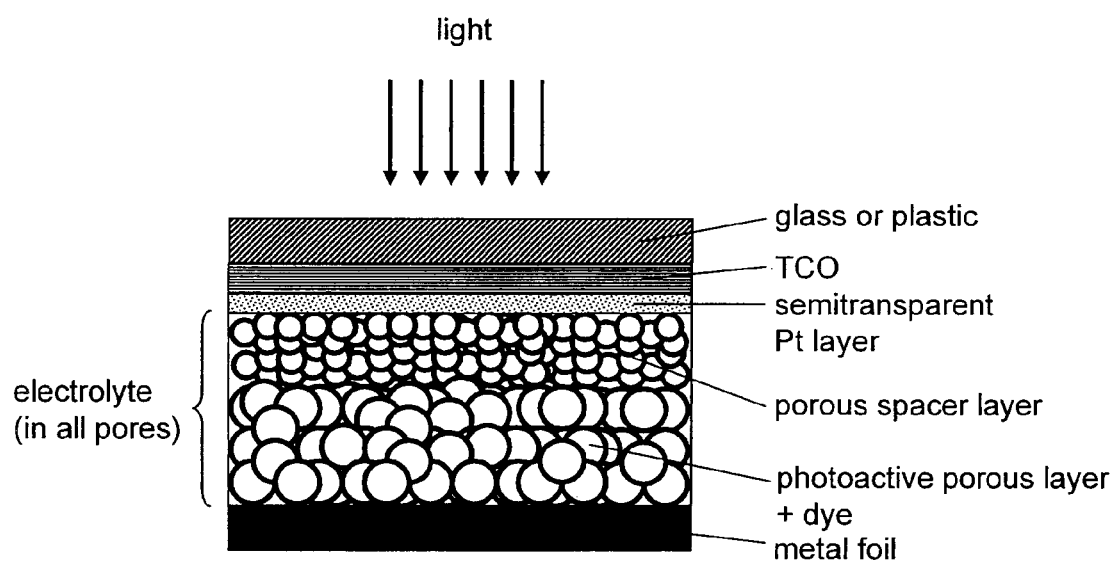
Figure 5:
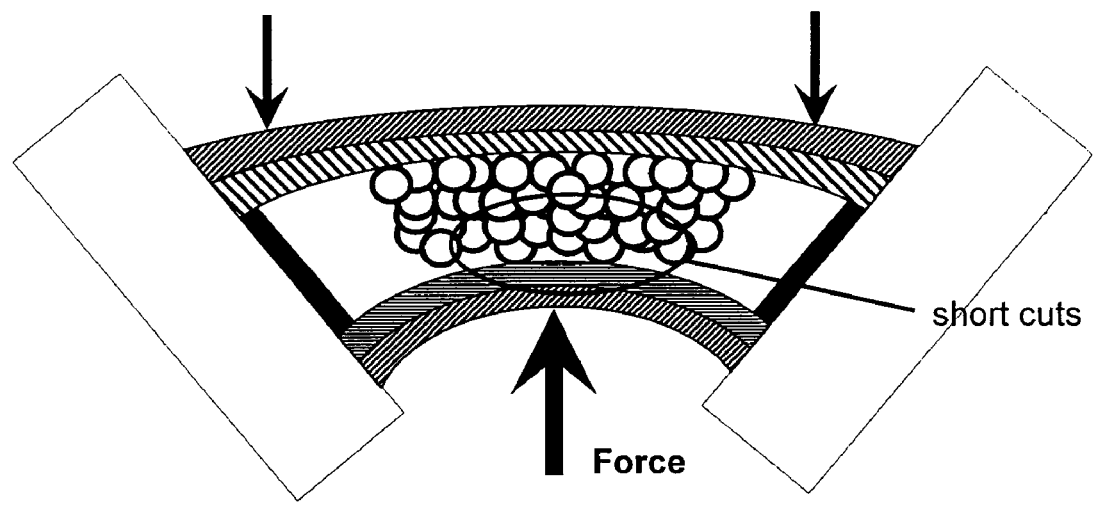
Figure 6:
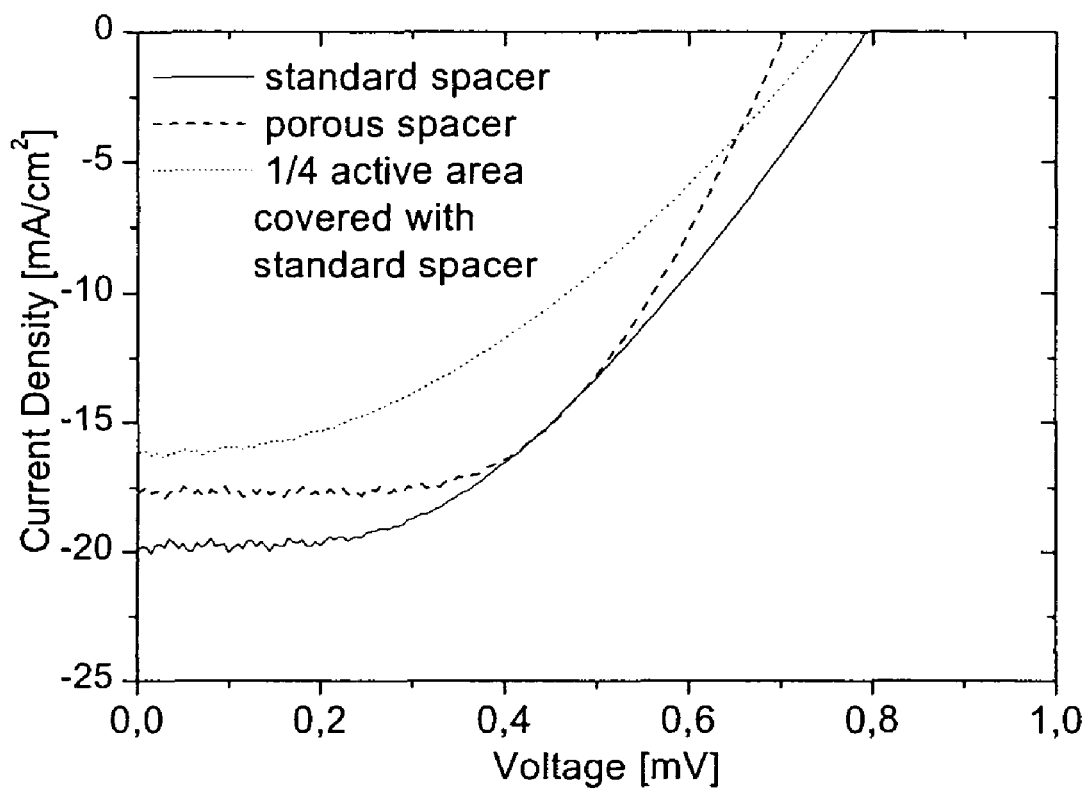

FIG. 4 shows the schematics of a backside illuminated dye-sensitized solar cell (DSSC) with a porous spacer layer, FIG. 5 shows the schematics of a flexible cell according to the prior art using standard spacer foils wherein the flexible cell is under external pressure. The contact between the photoactive semiconductor layer and the electrode (circled) that is caused by the exertion of pressure gives rise to short-circuiting and thus failure of the flexible cell, FIG. 6 shows the J-V-characteristics of cells with standard spacers, cells in which the photoactive porous layer are partly covered by spacer foil, and cells in accordance with the present invention using a porous spacer layer, FIG. 7 shows the photovoltaic parameters of a cell using spacer foils ("standard spacer"), a cell in which the photoactive porous layer is partly covered by spacer foil ("¼ of photoactive porous layer covered by standard spacer"), and a cell in accordance with the present invention, i.e. a cell using a porous spacer layer.

The invention will now be further described by reference to the following examples which is given to illustrate, not to limit the present invention.

EXAMPLE 1

Taking $TiO_2$ as an example, a $TiO_2$ suspension was synthesized as follows: Titanium(IV)isopropoxide is reacted with the same molar amount of acetic acid. A white solid precipitates after adding water. It is redispersed and nitric acid is added to the solution. The solution is heated to complete the peptisation. Hydrothermal synthesis is then carried out in a sealed titanium pressure vessel at 190° C. for 6 hours. Ultrasonic bath treatment, adjustment of $TiO_2$ content, and the addition of 1-propanol and ethanol then complete the synthesis.

A DSSC with porous spacer was assembled as follows: A 30-nm-thick bulk $TiO_2$ blocking layer is formed on FTO (approx. 100 nm on glass). A 10-µm-thick porous layer of semiconductor particles is screen printed on the blocking layer and sintered at 450° C. for half an hour. Red dye molecules (N3 bis-TBA) were adsorbed to the particles via self-assembling out of a solution in ethanol (0.3 mM) and the porous layer was filled with electrolyte containing $I^-/I_3^-$ as redox couple (15 mM). A porous $TiO_2$ spacer layer was applied on a reflective platinum back electrode by means of doctor blading a water based $TiO_2$ suspension. The porous spacer layer was dried at 150° C. and had a resulting thickness of about 5 µm. This counter electrode was also filled with the above-described electrolyte and was then directly sandwiched onto the active porous layer.

Figure 1:
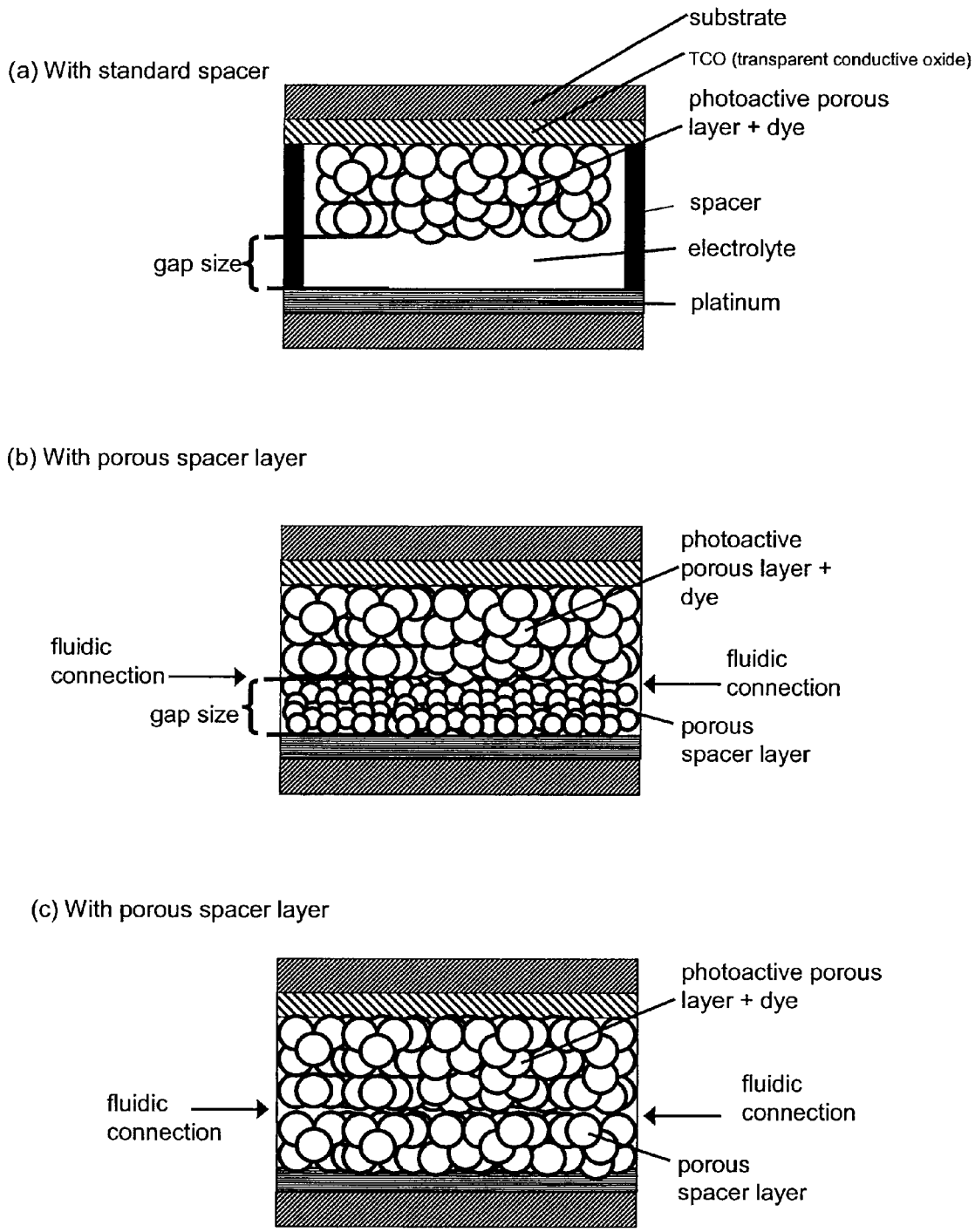
Figure 2:
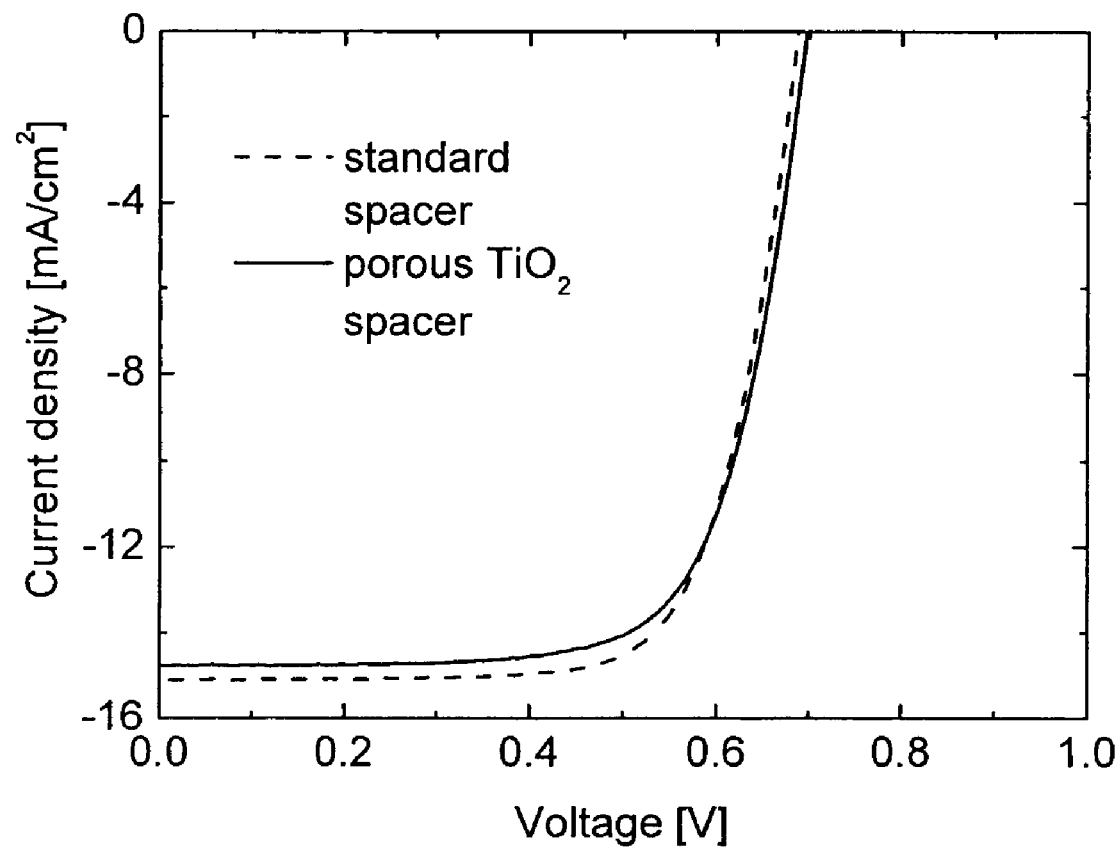
FIG. 2 shows the J-V-characteristics of cells with standard spacers and cells in accordance with the present invention using a porous spacer layer.

The according J-V-characteristics and the photovoltaic parameters are shown in FIG. 2 and FIG. 3, respectively. Almost the same efficiencies are obtained with standard spacers and porous spacers, however the porous spacers have the advantage of a vanishing probability of short cuts of the DSSC during operation. A slightly lower short circuit current density is observed since the nanoporous material used in this case was opaque. As a consequence, the light which is not harvested on its first travel through the active porous layer is mainly lost due to scattering processes whereas in the case of the standard spacer this part of the light can be reflected at the counter electrode and traverses the photoactive porous layer a second time.

However, a further advantage is that the optical properties of the nanoporous $TiO_2$ can be adjusted by the particle size and the degree of aggregation. Low aggregation and small particle size lead to transparent films. In the case of backside-illuminated DSSC, a transparent porous spacer layer is of increased advantage (FIG. 4).

EXAMPLE 2

Synthesis of $TiO_2$ suspension was done following the procedure described in example 1.

A DSSC with porous spacer was assembled as follows: blocking layer, porous layer as well as dye adsorption were prepared following the same procedure as described in example 1. The porous layer was penetrated by a polymer gel electrolyte based on a mixture of polyethylene oxide (3 wt %), propylene carbonate and ethylene carbonate with $I^-_3/I^-$ as the redox couple; the $I^-_3$ concentration was 15 mM and the ratio of propylene carbonate to ethylene carbonate was equal to one.

A porous $TiO_2$ spacer layer was applied on a reflective platinum back electrode by means of doctor blading a water based $TiO_2$ suspension. The porous spacer layer was dried at 150° C. and had a resulting thickness of about 2 μm. This counter electrode was also filled with the above-described electrolyte and was then directly sandwiched onto the active porous layer. As a standard spacer, a 2 μm thick foil was used.

The according J-V-characteristics and the photovoltaic parameters are shown in FIG. 6 and FIG. 7, respectively. Almost the same efficiencies are obtained with standard spacers and porous spacers. In a cell wherein ¼ of the active porous area are covered by a standard spacer layer, there is a dramatic decrease in efficiency and as a consequence in current density.

FIG. 6 shows the J-V-characteristics of cells with standard spacers, cells in which the photoactive porous layer are partly covered by spacer foil and cells in accordance with the present invention using a porous spacer layer.

FIG. 7 shows the photovoltaic parameters of a cell using spacer foils, a cell in which the photoactive porous layer is partly covered by spacer foil and a cell in accordance with the present invention.

The features of the present invention disclosed in the specification, the claims and/or in the accompanying drawings, may, both separately, and in any combination thereof, be material for realizing the invention in various forms thereof.

The invention claimed is:

1. A photovoltaic cell comprising:
a first substrate and a first electrode on said first substrate, or, alternatively, a first metal foil acting as a first substrate and a first electrode,
a porous semiconductor layer which is a photoactive layer, on said first electrode,
a porous spacer layer on said porous semiconductor layer,
a second electrode as counter-electrode on said porous spacer layer and in physical contact therewith, said second electrode being in the form of a layer covering said porous spacer layer,
a second substrate on said second electrode,
wherein said porous semiconductor layer has a first interstitial space formed by pores of said porous semiconductor layer, and said porous spacer layer has a second interstitial space formed by pores of said porous spacer layer, wherein said first interstitial space and said second interstitial space are in fluid connection with each other and are filled with an electrolyte, and wherein said porous spacer layer on one side is in physical contact with said second electrode, and wherein said porous spacer layer on another side is in physical contact with said porous semiconductor layer,
wherein said porous spacer layer is made of particles having sizes in the range of from 1 nm to 500 nm,
wherein said porous spacer layer has a thickness in the range of from 1 μm to 10 μm, and
wherein said porous spacer layer is a layer formed by stacking up spacer particles on each other.

2. The photovoltaic cell according to claim 1, wherein said porous spacer layer on one side over an entire area is in physical contact with said second electrode, and wherein said porous spacer layer on another side over an entire area is in physical contact with said porous semiconductor layer.

3. The photovoltaic cell according to claim 1, wherein, between said porous spacer layer and said second electrode, there is no void volume of electrolyte other than said second interstitial space.

4. The photovoltaic cell according to claim 1, wherein said porous spacer layer is made of an optically transparent material that is semiconducting or electrically insulating.

5. The photovoltaic cell according to claim 1, wherein said porous spacer layer has pores with a pore size in the range of from 5 nm to 100 μm.

6. The photovoltaic cell according to claim 1, wherein said porous spacer layer is made of particles having sizes in the range of from 1 nm to 300 nm.

7. The photovoltaic cell according to claim 1, wherein said particles are semiconductor particles or insulator particles.

8. The photovoltaic cell according to claim 7, wherein said semiconductor or insulator particles are made of a material or a combination of materials, selected from $TiO_2$, $SnO_2$, $Sb_2O_5$, CdTe, CdSe, CdS, ZnO, $Nb_2O_5$, $ZrO_2$, $CeO_2$, $WO_3$, $SiO_2$, $Al_2O_3$, $CuAlO_2$, $SrTiO_3$, $SrCu_2O_2$, $SiO_2$, silica or glass beads, heat resistant polymers, such as crosslinked silicone resin, crosslinked polystyrene, crosslinked acrylic resin, melamine-formaldehyde resin, aromatic polyamide resin, polyimide resin, polyamide-imide resin, crosslinked polyesters, metal carbonates, such as magnesium carbonate, calcium carbonate, metal sulfates, such as calcium sulfate, barium sulfate.

9. The photovoltaic cell according to claim 1, wherein said porous semiconductor layer is dye-sensitized and said porous spacer layer is not dye-sensitized.

10. The photovoltaic cell according to claim 1, wherein said porous spacer layer covers said porous semiconductor layer over the entire area of said porous semiconductor layer and thereby electrically insulates said porous semiconductor layer from said second electrode.

11. The photovoltaic cell according to claim 1, wherein said cell does not comprise any spacer entities, such as spacer foils, arranged between said first and said second electrode, that electrically insulate said porous semiconductor layer from said second electrode and that are located beside said porous semiconductor layer.

12. The photovoltaic cell according to claim 1, wherein said cell comprises said porous spacer layer as the only spacer entity to electrically insulate said porous semiconductor layer from said second electrode.

13. The photovoltaic cell according to claim 5, wherein said porous spacer layer has a pore size distribution or monodisperse pore size in the range of from 5 nm to 100 μm.

14. The photovoltaic cell according to claim 1, wherein said particles of said porous spacer layer have a particle size distribution or monodisperse pore size in the range of from 1 nm to 500 nm.

15. The photovoltaic cell according to claim 1, wherein said porous spacer layer covers parts of the area of said porous semiconductor layer and does not cover other parts of the area of said porous semiconductor layer, and wherein the covered area of said porous semiconductor layer is >50% of the entire area of said porous semiconductor layer.

16. The photovoltaic cell according to claim 1, wherein, in said porous spacer layer a ratio between gap size and pore size is in the range of from 1 to 1000.

17. The photovoltaic cell according to claim 1, wherein said porous spacer layer is produced via a method selected from screen printing, doctor blading, ink-jet-printing, drop-casting, spin coating, spraying, electrostatic layer-by-layer self-assembly, lift-off process, mineralization, and anodic oxidation.

18. The photovoltaic cell according to claim 1, wherein
   a first metal foil is used instead of said first substrate and said first electrode together,
   said second electrode is a semitransparent metal layer,
   said cell comprises said second substrate which is a transparent substrate, and
   between said second substrate and said second electrode, there is a transparent conductive oxide.

19. The photovoltaic cell according to claim 1, wherein said porous spacer layer is made of particles having sizes in the range of from 1 nm to 200 nm.

20. The photovoltaic cell according to claim 1, wherein said porous spacer layer is made of particles having sizes in the range of from 10 nm to 100 nm.

21. The photovoltaic cell according to claim 1, wherein the first electrode is a transparent conductive oxide layer covering the first substrate.

22. Use of a porous spacer layer in a photovoltaic cell for preventing short circuiting between a photoactive semiconductor layer and a counter electrode of said cell, and/or for insulating a photoactive semiconductor layer and a counter electrode of said cell from each other, wherein said porous spacer layer is as defined in claim 1.

* * * * *